(12) United States Patent (10) Patent No.: US 8,713,320 B2
Xu et al. (45) Date of Patent: Apr. 29, 2014

(54) SECURITY AUTHENTICATION METHOD, APPARATUS, AND SYSTEM

(75) Inventors: Yixian Xu, Beijing (CN); Xiaohan Liu, Shenzhen (CN); Yingxin Huang, Beijing (CN); Lijia Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/606,838

(22) Filed: Sep. 7, 2012

(65) Prior Publication Data

US 2012/0331298 A1 Dec. 27, 2012

Related U.S. Application Data

(63) Continuation of application No. PCT/CN2011/071727, filed on Mar. 11, 2011.

(30) Foreign Application Priority Data

Mar. 11, 2010 (CN) .......................... 2010 1 0123910

(51) Int. Cl.
  *H04L 9/32* (2006.01)
(52) U.S. Cl.
  USPC .......................................... 713/171
(58) Field of Classification Search
  USPC .......................................... 713/171
  See application file for complete search history.

(56) References Cited

U.S. PATENT DOCUMENTS

| 7,257,836 | B1 * | 8/2007 | Moore et al. .................. 726/5 |
| 2004/0230799 | A1 * | 11/2004 | Davis ............................ 713/169 |
| 2007/0169107 | A1 | 7/2007 | Huttunen |
| 2009/0217348 | A1 * | 8/2009 | Salmela et al. ................ 726/2 |
| 2009/0253409 | A1 | 10/2009 | Slavov et al. |
| 2009/0307492 | A1 | 12/2009 | Cao et al. |
| 2010/0325424 | A1 * | 12/2010 | Etchegoyen .................. 713/155 |

FOREIGN PATENT DOCUMENTS

| CN | 1433537 | 7/2003 |
| CN | 101005357 | 7/2007 |
| CN | 101931935 | 12/2010 |
| EP | 2106090 | 9/2009 |
| WO | 2008/088414 | 7/2008 |

(Continued)

OTHER PUBLICATIONS

International Search Report of Corresponding PCT Application PCT/CN2011/071727 mailed Jun. 23, 2011.

(Continued)

*Primary Examiner* — Matthew Smithers
(74) *Attorney, Agent, or Firm* — Staas & Halsey LLP

(57) ABSTRACT

Embodiments of the present invention provide a security authentication method, apparatus, and system, where the method includes: verifying a feature identifier for identifying terminal equipment, where the terminal equipment is machine-to-machine equipment; and obtaining a key corresponding to the feature identifier, so as to perform secure communication with the terminal equipment according to the key. In the embodiments of the present invention, after terminal equipment, a mobility management entity, and a home subscriber system successfully perform authentication and key agreement, it is verified whether a feature identifier of the terminal is legal, and when the feature identifier of the terminal is a legal identifier, a key is obtained according to the feature identifier, so that the mobility management entity and the terminal equipment perform secure communication according to the key, thereby implementing secure communication between M2M equipment and a network side.

43 Claims, 9 Drawing Sheets

(56) References Cited

FOREIGN PATENT DOCUMENTS

| WO | WO 2009/092115 A2 | 7/2009 |
| WO | WO 2011/159952 A1 | 12/2011 |
| WO | WO 2012/097883 A1 | 7/2012 |

OTHER PUBLICATIONS

Written Opinion of the International Searching Authority, dated Jun. 10, 2011, in corresponding International Application No. PCT/CN2011/071727 (4 pp.).

Chinese Office Action mailed Feb. 28, 2013 for corresponding Chinese Application No. 201010123910.0.

Extended European Search Report mailed Mar. 26, 2013 for corresponding European Application No. 11752844.8.

$3^{rd}$ Generation Partnership Project (3GPP), "$3^{rd}$ Generation Partnership Project; Technical Specification Group Services and System Aspects; System Improvements for Machine-Type Communications; (Release 10)", 3GPP Standard, 3GPP TR 23.888, Mobile Competence Centre, No. V0.3.1, Mar. 5, 2010, pp. 1-33.

\* cited by examiner

SECURITY AUTHENTICATION METHOD, APPARATUS, AND SYSTEM

CROSS-REFERENCE TO RELATED APPLICATIONS

This application is a continuation of International Application No. PCT/CN2011/071727, filed on Mar. 11, 2011, which claims priority to Chinese Patent Application No. 201010123910.0, filed on Mar. 11, 2010, both of which are hereby incorporated by reference in their entireties.

FIELD OF THE INVENTION

Embodiments of the present invention relate to the field of communications technologies, and in particular, to a security authentication method, apparatus, and system.

BACKGROUND OF THE INVENTION

An existing 3GPP network is directed to Human-to-Human (Human-to-Human, H2H) communication, where a user identifier and equipment are in one-to-one correspondence, and the network only manages the user identifier. For example, when a mobile phone is used, a SIM card and the mobile phone are in one to one correspondence, and the network only manages the SIM card. An existing security technology may include: when a user equipment (UE) gets access to a network, a network side obtains a key (K) according to a user identifier uniquely corresponding to the UE, generates an authentication vector (Authentication Vector, hereinafter referred to as AV), completes inter-authentication of the UE and the network side by using the AV and generates system keys, so as to ensure secure communication between the UE and the network side. The user identifier may be an international mobile subscriber identity (International Mobile Subscriber Identity, IMSI).

In machine-to-machine (Machine-to-Machine, M2M) communication, the user identifier and the equipment are not in simple one-to-one correspondence, but in a multi-to-multi relationship. For example, one user corresponds to multiple pieces of terminal equipment, multiple users share one piece of terminal equipment, or multiple users correspond to multiple pieces of terminal equipment.

During a process of implementing the present invention, the inventors find that, in the M2M communication, if the existing security technology is used, secure communication may not be performed between the UE and the network side. Therefore, it is required to provide a security technology in the M2M communication, so as to implement secure communication between M2ME and the network side.

SUMMARY OF THE INVENTION

Embodiments of the present invention provide a security authentication method, apparatus, and system, so as to implement secure communication between M2M equipment and a network side.

An embodiment of the present invention provides a security authentication method, including:
verifying a feature identifier for identifying terminal equipment, where the terminal equipment is machine-to-machine equipment; and obtaining a key corresponding to the feature identifier, so as to perform secure communication with the terminal equipment according to the key.

An embodiment of the present invention further provides a security authentication method, including:
receiving a service message which is sent by a mobility management entity and corresponds to a feature identifier for identifying terminal equipment, where the terminal equipment is machine-to-machine equipment; and obtaining a key according to the service message, so as to perform secure communication with the mobility management entity according to the key.

An embodiment of the present invention provides a mobility management entity, including:
a verification module, configured to verify a feature identifier for identifying terminal equipment, where the terminal equipment is machine-to-machine equipment; and
an obtaining module, configured to obtain a key corresponding to the feature identifier verified by the verification module, so as to perform secure communication with the terminal equipment according to the key.

An embodiment of the present invention provides terminal equipment, including:
a first receiving module, configured to receive a service message which is sent by a mobility management entity and corresponds to a feature identifier for identifying terminal equipment; and
an obtaining module, configured to obtain a key according to the service message received by the first receiving module, so as to perform secure communication with the mobility management entity according to the key, where the terminal equipment is machine-to-machine equipment.

An embodiment of the present invention provides a security authentication system, including any mobility management entity and any terminal equipment which are provided by the embodiments of the present invention.

In the security authentication method, apparatus, and system in the embodiments of the present invention, after terminal equipment, a mobility management entity, and a home subscriber system successfully perform authentication and key agreement, it is verified whether a feature identifier of a terminal is legal, and when the feature identifier of the terminal is a legal identifier, a key is obtained according to the feature identifier, so that the mobility management entity and the terminal equipment perform secure communication according to the key, thereby implementing secure communication between M2M equipment and a network side.

DETAILED DESCRIPTION OF THE EMBODIMENTS

M2M means that communication can be directly performed between machines without manual intervention. There are plenty of application types of M2M which may include, for example, the following applications: an automatic meter (a water meter, an electricity meter, and a gas meter), remote monitoring, industrial safety and home automation, a payment system (an automatic teller machine, a payment terminal, a parking meter, and so on), remote vehicle control (for example, fleet management, toll charging, vehicle recovery, premium paying according to driving conditions, and so on), and so on. A terminal used in M2M communication is called M2M equipment (M2M equipment, hereinafter referred to as M2ME), and the M2ME may be user equipment UE with M2M characteristics. The M2ME may access a network such as GSM, GPRS, UTRAN or EUTRAN and communicate with an M2M server or other M2ME, to implement M2M application. Embodiments of the present invention may be applied in an M2ME communication process and may also be applied in a process of relay (Relay) equipment accessing a network by using a pluggable card. The M2ME communication process is taken as an example in the following for illustration.

Figure 1:
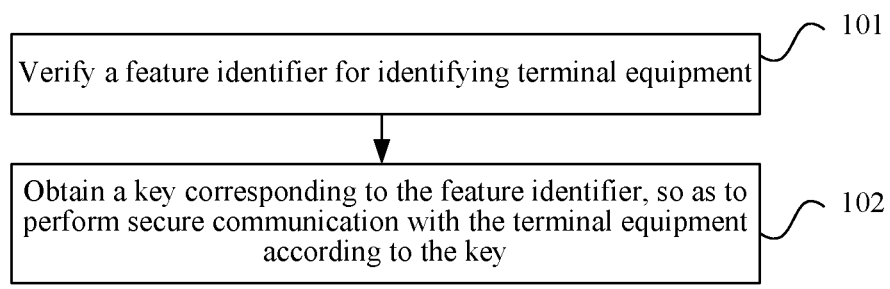
FIG. 1 is a flow chart of a security authentication method according to an embodiment of the present invention.

FIG. 1 is a flow chart of a security authentication method according to an embodiment of the present invention. In this embodiment, a mobility management entity is used as an execution body. As shown in FIG. 1, the method includes:

101: Verify a feature identifier for identifying terminal equipment, where the terminal equipment is M2ME.

This embodiment may be applied in multiple kinds of networks, for example, 3GPP EPS, UMTS, and GSM, and a case that this embodiment is applied in the 3GPP EPS network is taken as an example in the following for illustration.

The terminal equipment in the embodiment of the present invention may be M2ME (that is, MTC (machine type communication) equipment), and the M2ME includes a user identifier and a feature identifier. The user identifier and the M2ME may be in a one-to-multi relationship, that is, multiple pieces of M2ME share one user identifier. The feature identifier is used to identify each piece of M2ME, each piece of M2ME has a feature identifier, and the feature identifier of each piece of M2ME is different. The feature identifier may be an equipment identifier of the M2ME, and may also be a certificate of the Mv2ME.

According to the user identifier, the M2ME, the mobility management entity (Mobility Management Entity, hereinafter referred to as MME) and a home subscriber system (Home Subscriber System, hereinafter referred to as HSS) perform authentication and key agreement (Authentication and key agreement, hereinafter referred to as AKA), to implement inter-authentication of the M2ME and a network side, and generate a cipher key (Cipher Key, hereinafter referred to as CK) and an integrity key (Integrity Key, hereinafter referred to as IK).

After the authentication and key agreement succeeds, it is verified whether the feature identifier of the M2ME is legal. The verifying process may be that: the MME receives a feature identifier sent by the M2ME, and then verifies the feature identifier according to a pre-configured rule; the verifying process may also be that: the MME receives a feature identifier sent by the M2ME, and then sends the feature identifier to an equipment identity register (Equipment Identity Register, hereinafter referred to as EIR), and the EIR verifies the feature identifier according to a pre-configured rule.

102: Obtain a key corresponding to the feature identifier, so as to perform secure communication with the terminal equipment according to the key.

After the MME or the EIR verifies the feature identifier, if the feature identifier is a legal identifier, a key may be obtained according to the feature identifier, and the M2ME may also obtain the key through the communication between the MME and the M2ME and through an encryption algorithm pre-agreed by the MME and the M2ME, thereby implementing secure communication between the MME and the M2ME according to the key.

There may be multiple methods for obtaining the key according to the feature identifier. For example, (1) the EIR or the MME obtains, according to the feature identifier, a first key corresponding to the feature identifier, and then the MME obtains a key (M-Kasme) according to the CK, the IK and the first key and by using an encryption algorithm agreed by the MME and the M2ME, where the first key may be a key uniquely corresponding to the feature identifier of the M2ME and may also be a random number; and (2) the MME generates a new CK and a new IK, for example, a second CK and a second IK, or a third CK and a third IK, according to the CK, the IK and the feature identifier and by using an encryption algorithm agreed by the MME and the M2ME, and then obtains M-Kasme according to the second CK and the second IK, or in a UMTS network, the MME and the M2ME can directly perform secure communication by using the third CK and the third IK as keys.

The MME and the M2ME perform secure communication according to the foregoing obtained key, and before the secure communication, the M2ME receives a first key or an indication message sent by the MME. After receiving the first key sent by the MME, the M2ME obtains a key (M-Kasme) according to the CK, the IK and the first key and by using an encryption algorithm agreed by the MME and the M2ME. After receiving an indication message sent by the MME, the M2ME generates a new CK and a new IK, for example, a second CK and a second IK or a third CK and a third IK, according to the CK, the IK and the feature identifier and by using an encryption algorithm agreed by the MME and the M2ME; and then obtains M-Kasme according to the second CK and the second IK, or in a UMTS network, the M2ME may directly perform secure communication with the MME by using the third CK and the third IK as keys in the UMTS network.

In the security authentication method according to the embodiment of the present invention, after the terminal equipment, mobility management entity, and home subscriber system successfully perform the authentication and key agreement, it is verified whether the feature identifier is legal, and when the feature identifier is a legal identifier, the key is obtained according to the feature identifier, so that the mobility management entity and the terminal equipment perform secure communication according to the key, thereby implementing secure communication between the M2M equipment and the network side.

Figure 2:
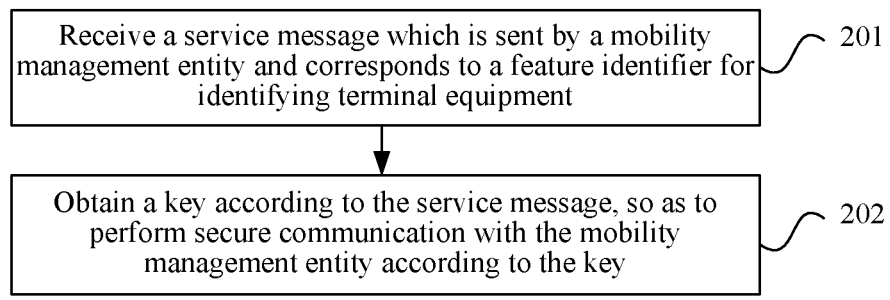
FIG. 2 is a flow chart of another security authentication method according to an embodiment of the present invention.

FIG. 2 is a flow chart of another security authentication method according to an embodiment of the present invention. This embodiment corresponds to the embodiment shown in FIG. 1, where terminal equipment is used as an execution body. As shown in FIG. 2, the method includes:

201: Receive a service message which is sent by a mobility management entity and corresponds to a feature identifier for identifying terminal equipment, where the terminal equipment is M2ME.

The terminal equipment in the embodiment of the present invention may be M2ME, and the M2ME includes a user identifier and a feature identifier. The user identifier and the M2ME may be in a one-to-multi relationship, that is, multiple pieces of M2ME share one user identifier. The feature identifier is used to identify each piece of M2ME, each piece of M2ME has a feature identifier, and the feature identifier of each piece of M2ME is different. The feature identifier may be an equipment identifier of the M2ME or a certificate of the M2ME.

After the M2ME, the MME, and an HSS successfully perform AKA according to the user identifier of the M2ME, and the feature identifier of the M2ME is verified to be a legal identifier, the M2ME receives a service message sent by the MME, where the service message corresponds to the feature identifier; and a CK and an IK are generated in the AKA process.

The service message may be a first key corresponding to the feature identifier, and may also be an indication message.

202: Obtain a key according to the service message, so as to perform secure communication with the mobility management entity according to the key.

When the service message received by the M2ME includes the first key, the M2ME obtains a key (M-Kasme) according to the CK, the IK and the first key and by using an encryption algorithm agreed by the MME and the M2ME. When the service message received by the M2ME includes the indication message, the M2ME generates a new CK and a new IK, for example, a second CK and a second IK or a third CK and a third IK, according to the CK, the IK and the feature identifier and by using an encryption algorithm agreed by the MME and the M2ME; and then obtains M-Kasme according to the second CK and the second IK, or the M2ME may directly perform secure communication with the MME by using the third CK and the third IK as keys in the UMTS network.

In the security authentication method in the embodiment of the present invention, when the terminal equipment, mobility management entity, and home subscriber system successfully perform authentication and key agreement, and it is verified that the feature identifier is a legal identifier, the terminal equipment obtains the key according to the service message corresponding to the feature identifier, so that the mobility management entity and the terminal equipment perform secure communication according to the key, thereby implementing secure communication between M2M equipment and a network side.

Figure 3:
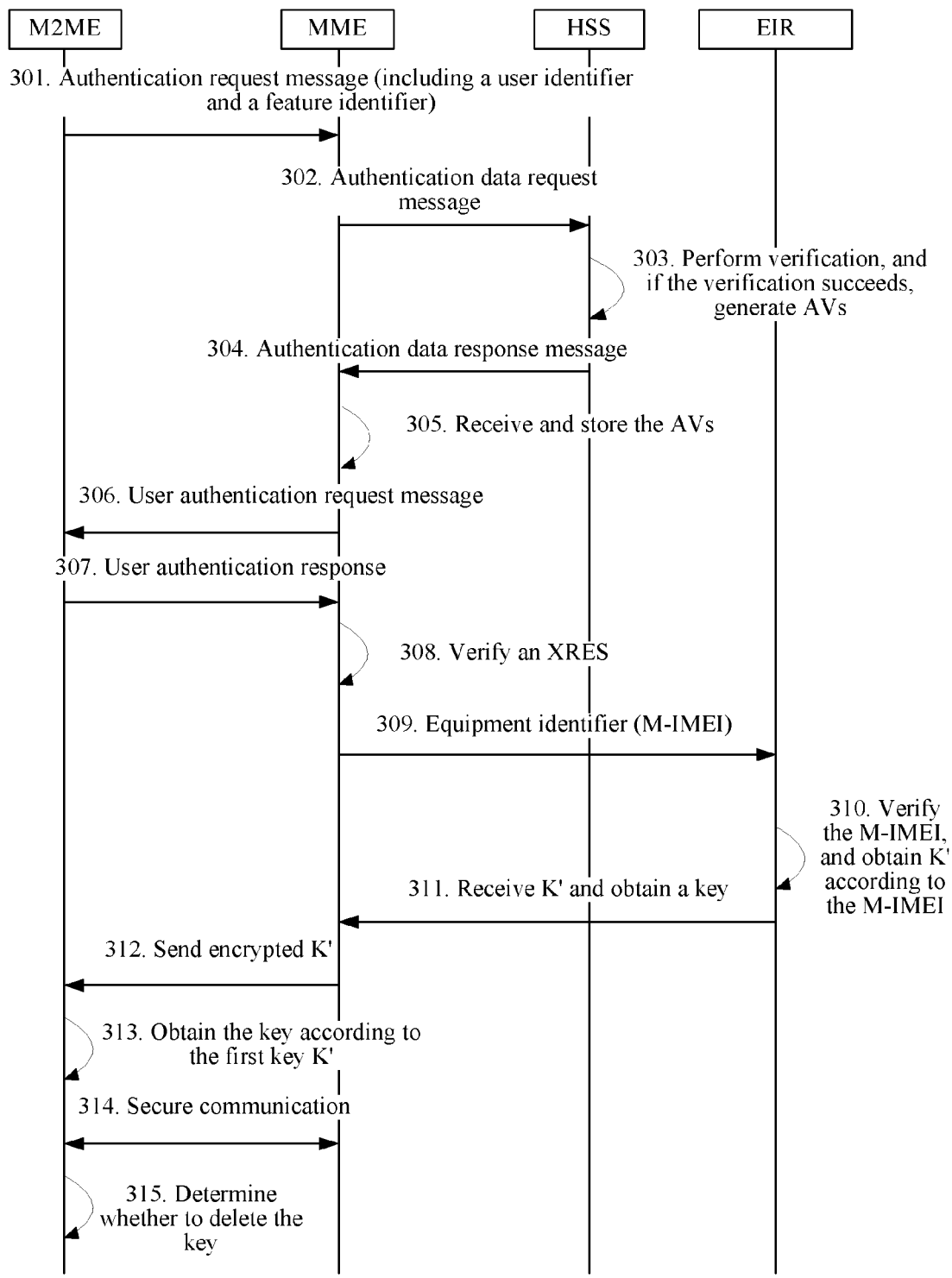
FIG. 3 is a signaling diagram of still another security authentication method according to an embodiment of the present invention.

FIG. 3 is a signaling diagram of still another security authentication method according to an embodiment of the present invention. As shown in FIG. 3, the method includes:

301: Terminal equipment sends an authentication request message including a user identifier and a feature identifier to a mobility management entity.

In this embodiment, the terminal equipment may be M2ME, the user identifier may be an IMSI, and the feature identifier may be an equipment identifier, where the equipment identifier may be specifically an International Mobile Equipment Identity (International Mobile Equipment Identity, IMEI) and is abbreviated as M-IMEI in the following.

The embodiment of the present invention does not limit the form of the equipment identifier of the terminal equipment. For example, the equipment identifier may also be an IMSI. In this case, the terminal equipment may have two IMSIs (IMSIa and IMSIb), where IMSIa is used as the user identifier and IMSIb is used as the equipment identifier of the M2M equipment.

The M2ME sends an authentication request message to the MME, where the authentication request message may include an IMSI, an IMEI, and M, and M is used to identify that the terminal equipment is M2ME. The identifier M may be pre-configured in the M2ME, or an identifier M may also be allocated by the MME for M2M authentication and then the identifier M is sent to the M2ME by the MME.

After step 301, the MME sends the received user identifier and equipment identifier, which are sent by the terminal equipment, to a home subscriber system for verification, so as to verify legality of correspondence between the user identifier and the equipment identifier. If the home subscriber system verifies that the correspondence between the user identifier and the equipment identifier is legal, authentication and key agreement is performed according to the user identifier, as shown specifically in 302 to 308.

302: The MME sends an authentication data request message to the HSS, where the authentication data request message includes an IMSI, an M-IMEI, and a serving network ID (Serving network ID, SN ID), and the SN ID refers to an ID of a currently serving operator network.

303: The HSS verifies, by querying a database, whether correspondence between the IMSI and the M-IMEI is legal; if the verification succeeds, that is, if the correspondence between the IMSI and the M-IMEI is legal, generates authentication vectors AVs.

An M2M user informs an operator of binding correspondence between the IMSI and the M-IMEI during registration, and stores the binding correspondence between the IMSI and the M-IMEI in an HSS database. The HSS may know, by querying the database, whether the correspondence between the IMSI and the M-IMEI is legal. The following security threats may be prevented by checking the legality of the correspondence between the IMSI and the M-IMEI. For example, when an attacker legally owns a piece of M2ME and illegally duplicates an IMSI, the attacker may be prevented, by checking the correspondence, from illegally accessing an network; for another example, when an attacker legally owns an IMSI, illegally steals an M-IMEI and writes the stolen M-IMEI into a piece of M2ME manufactured by the attacker, the attacker may also be prevented, by checking the correspondence, from illegally accessing an network.

304: The HSS sends an authentication data response message to the MME, where the response message includes the authentication vectors AVs.

305: The MME receives the authentication data response message sent by the HSS, and stores the AVs.

306: The MME sends a user authentication request message to the M2ME, where the user authentication request message includes an authentication token (Authentication Token, abbreviated as AUTH), a random number Random (RAND), and KSlasme (a key index of Kasme, used for indicating Kasme).

307: After receiving the user authentication request message, the M2ME authenticates the network by verifying the value of a message authentication code (Message Authentication Code, abbreviated as MAC) in the user authentication request message, calculates a CK, an IK and an XRES (Expected response, Expected response), and then sends a user authentication response to the MME, where the response includes the XRES.

308: After receiving the user authentication response, the MME verifies whether the XRES is equal to an RES, to complete authentication of the terminal.

In the embodiment of the present invention, the step of verifying whether the correspondence between the IMSI and the M-IMEI is legal in step 303 may also be not included, but the M2ME, the MME, and the HSS directly perform AKA according to the IMSI.

309: The mobility management entity sends the equipment identifier to verification equipment for verification, where the equipment identifier is the received equipment identifier sent by the terminal equipment, and the verification equipment is used for verifying the equipment identifier.

After the AKA succeeds, the MME sends the M-IMEI to the verification equipment for verification, where the verification equipment may be, for example, an equipment identity register (Equipment Identity Register, hereinafter referred to as EIR).

310: The EIR verifies whether the M-IMEI is a legal identifier, and when the M-IMEI is a legal identifier, obtains, according to the M-IMEI, a first key K' corresponding to the M-IMEI.

The EIR verifies the M-IMEI according to a pre-configured rule. The first key K' may be a key uniquely corresponding to the M-IMEI, and may also be a random number. The first key K' may be pre-generated, and may also be generated when a request of the MME is received. Each M-IMEI corresponds to a different first key K'.

The first key K' may be generated in the EIR, and may also be generated in the MME.

311: The MME receives the first key K' sent by the EIR, and then obtains a key according to the CK, the IK and the first key K'.

Operator network domain security exists between the MME and the EIR, and it is considered by default that the first key K' can be securely sent.

The MME calculates M-Kasme=KDF(CK, IK, K', PLMN-ID) according to K', where KDF is a key derivation function (Key Derivation Function).

The embodiment of the present invention does not impose a limitation that M-Kasme is calculated in the MME, and the M-Kasme may also be calculated by the HSS and then sent to the MME.

312: The MME encrypts the first key K' according to the CK and the IK, and sends the encrypted first key K' to the M2ME.

The MME performs encryption protection on the first key K' by using the CK and an encryption algorithm, calculates FC (CK, K'), and then calculates an MAC by using the IK and an integrity protection algorithm FI, and sends a message including FC (CK, K') and the MAC to the M2ME, where the encryption algorithm FC and the integrity algorithm FI are pre-configured in the MME and the M2ME.

Algorithms for performing encryption and integrity protection on K' may be pre-configured in the MME and the M2ME, and may also be implemented in a key agreement manner.

313: The M2ME receives the first key K' which is sent by the MME and is encrypted by the MME according to the CK and the IK, and then obtains the key M-Kasme according to the first key K'.

The M2ME performs integrity verification on the received message including FC (CK, K') and the MAC, and then according to the encryption algorithm FC and the integrity algorithm FI that are pre-configured in the M2ME, decrypts the message to obtain the first key K', and then obtain M-Kasme through calculation according to the first key K', the CK, and the IK, where $$M\text{-Kasme}=KDF(CK,IK,K',PLMN\text{-ID}).$$

314: The M2ME and the MME performs a non access stratum (Non Access Stratum, NAS) security mode command (Security Mode Command, SMC) process according to an evolved packet system (Evolved packet system, EPS) mechanism, so that the M2ME and the network side may securely perform communication according to M-Kasme and a negotiated algorithm.

After 314, 315 may be further included.

315: After performing secure communication with the MME according to the key, the M2ME determines, according to an indication identifier received from the MME or an indication identifier pre-configured in the M2ME, whether to delete the key.

According to an existing LTE mechanism, the terminal may delete an EPS security context stored in the terminal itself in the following three cases: (1) A UICC is taken away in a power-on state of an ME; (2) when starting up, the ME finds that a UICC is changed; (3) when starting up, the ME finds that no UICC exists.

In an scenario where the M2ME performs communication, according to the foregoing existing LTE mechanism, after an SIM card located in a piece of M2ME is taken away after the M2ME performs communication, the M2ME deletes M-Kasme which is calculated this time, which causes an interruption of communication between a terminal side and the network side.

Based on this, content described in 315 may be further included in the embodiment of the present invention, and may specifically be that: the MME may identify the type of this authentication by using 2-bit type (Type) data, and send the Type to the M2ME. The M2ME determines, according to the Type, whether to delete M-Kasme. For example, when Type=00, M-Kasme is deleted after the card is removed; and when Type=01, M-Kasme is not deleted after the card is removed. Alternatively, the M2ME determines, according to an identifier M used as an indication identifier, whether to delete M-Kasme, and when recognizing the identifier M, does not delete M-Kasme after the card is removed. Alternatively, a policy of not deleting M-Kasme may be pre-configured in the M2ME.

In the security authentication method in the embodiment of the present invention, after the terminal equipment, mobility management entity, and home subscriber system successfully perform authentication and key agreement the home subscriber system verifies whether the equipment identifier is legal, and when the equipment identifier is a legal identifier, the mobility management entity obtains the key according to the equipment identifier, so that the mobility management entity and the terminal equipment perform secure communication according to the key, thereby implementing secure communication between the M2M equipment and network side. Moreover, in this embodiment, the correspondence between the user identifier and the equipment identifier is verified, which can prevent an attacker from illegally accessing the network, and further improves the authentication security.

Figure 4:
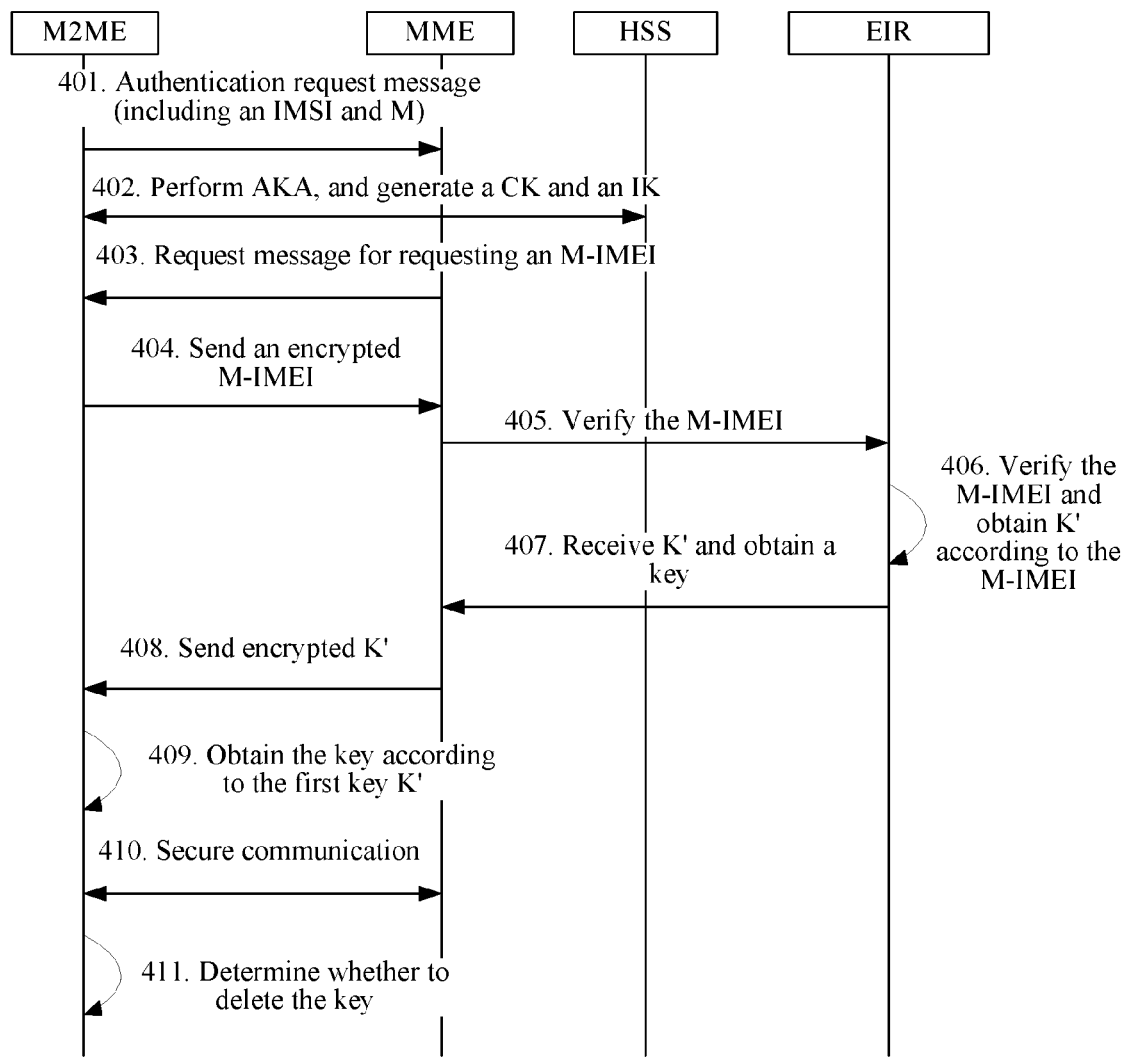
FIG. 4 is a signaling diagram of still another security authentication method according to an embodiment of the present invention.

FIG. 4 is a signaling diagram of still another security authentication method according to an embodiment of the present invention. As shown in FIG. 4, the method includes:

401: M2ME sends an authentication request message to an MME, where the authentication request message may include an IMSI and M, and M is used to identify the terminal equipment.

402: The M2ME, the MME, and an HSS perform AKA based on the IMSI, to implement inter-authentication of the M2ME and a network side; and generate a CK and an IK.

403: After the AKA succeeds, the MME sends, to the M2ME, a request message for requesting an M-IMEI.

After the AKA based on the IMSI succeeds, the M2ME receives the request message sent by the MME.

404: After receiving the request of the MME, the M2ME encrypts the M-IMEI according to the CK and/or the IK, and then sends the encrypted M-IMEI to the MME according to the request message of the MME.

After receiving the request of the MME, the M2ME performs encryption protection on the M-IMEI according to a pre-configured encryption algorithm fc, where a protection key is the CK; and then sends fc (CK, M-IMEI) to the MME, where the protection key may be the CK and/or the IK.

The encryption algorithm may be pre-configured in the MME and the M2ME, and may also be implemented in a key agreement manner.

In this embodiment, only after the AKA, the MME requests the M-IMEI from the M2ME; the M2ME encrypts the M-IMEI by using the CK and then sends the encrypted M-IMEI to the MME, thereby avoiding sending the M-IMEI by using a plaintext, which can effectively prevent an attacker from stealing the M-IMEI and improve authentication security.

405: The MME receives the M-IMEI which is sent by the M2ME according to the request message and is encrypted by the M2ME according to the CK and/or the IK; and then decrypts the encrypted M-IMEI, and sends the decrypted M-IMEI to an EIR for verification.

This embodiment further includes 406 to 411, where 406 to 411 are the same as 310 to 315 in the embodiment shown in FIG. 3, and the details are not described herein again.

In the security authentication method according to the embodiment of the present invention, after the terminal equipment, mobility management entity, and home subscriber system successfully perform authentication and key agreement, the home subscriber system verifies whether an equipment identifier is legal, and when the equipment identifier is a legal identifier, the mobility management entity obtains a key according to the equipment identifier, so that the mobility management entity and the terminal equipment perform secure communication according to the key, thereby implementing secure communication between the M2M equipment and network side. Moreover, in this embodiment, only after the authentication and key agreement succeeds, the mobility management entity requests the equipment identifier of the terminal equipment from the terminal equipment, so that the terminal equipment encrypts the equipment identifier according to a cipher key and/or an integrity key which are generated after the authentication succeeds, and then sends the encrypted equipment identifier to the mobility management entity, thereby avoiding sending the equipment identifier by using a plaintext and further improving the authentication security.

Figure 5:
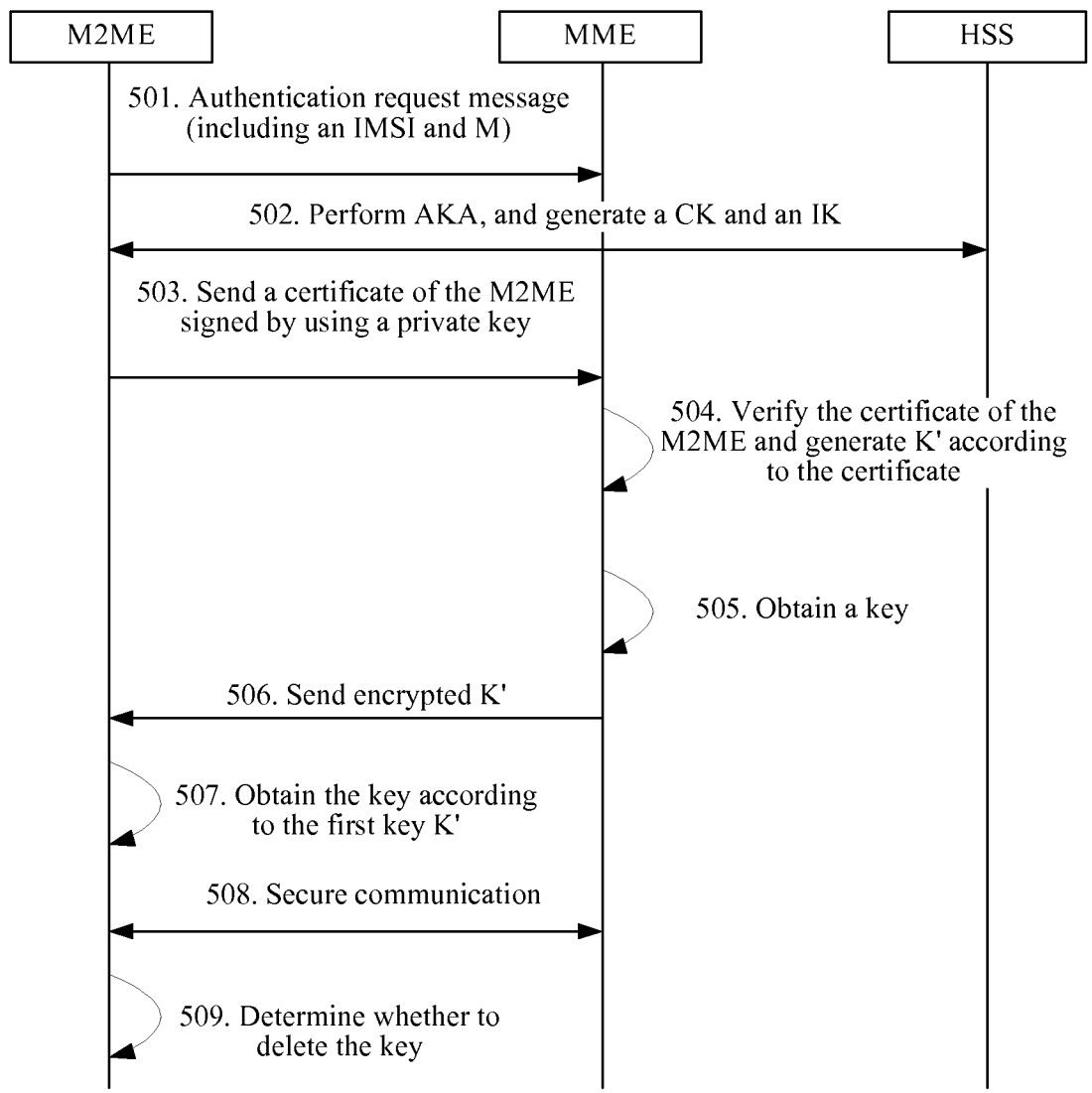
FIG. 5 is a signaling diagram of still another security authentication method according to an embodiment of the present invention.

FIG. 5 is a signaling diagram of still another security authentication method according to an embodiment of the present invention. As shown in FIG. 5, the method includes:

501: M2ME sends an authentication request message to an MME, where the authentication request message may include an IMSI and M, and M is used to identify the terminal equipment.

In this embodiment, the M2M equipment is authenticated based on a certificate of the M2ME. Legality of the M2ME can be verified in such a manner, thereby avoiding that counterfeit M2ME accesses the network, and further improving security. In this embodiment, a feature identifier may be a certificate of the M2ME.

502: The M2ME, the MME, and an HSS perform AKA based on the IMSI, to implement inter-authentication of the M2ME and a network side; and generate a CK and an IK.

503: After the AKA succeeds, the M2ME sends, to the MME, a certificate of the M2ME signed by using a private key.

504: The MME verifies whether the received certificate of the M2ME is legal, which may specifically be that: the MME verifies, by using a CA public key, whether a signature of the certificate of the M2ME is correct, and if the MME verifies that the signature of the certificate is correct, calculates an authentication token (AUTH) according to a public key M of the certificate, to verify legality of the certificate. When the certificate is legal, the MME generates, according to the certificate, a first key K' corresponding to the certificate.

505: The MME obtains a key according to the CK, the IK and the first key K'.

The MME calculates M-Kasme=KDF(CK, IK, K', PLMN-ID) according to K'.

This embodiment further includes 506 to 509, where 506 to 509 are the same as 312 to 315 in the embodiment shown in FIG. 3, and the details are not described herein again.

In the security authentication method according to the embodiment of the present invention, after the terminal equipment, mobility management entity, and home subscriber system successfully perform authentication and key agreement, the home subscriber system verifies whether a feature identifier of a terminal is legal, and when the feature identifier is legal, the mobility management entity obtains the key according to the feature identifier, so that the mobility management entity and the terminal equipment perform secure communication according to the key, thereby implementing secure communication between the M2ME and network side. Moreover, in this embodiment, the certificate of the M2ME is used as the feature identifier, and therefore by verifying the legality of the certificate of the M2ME, it is avoided that counterfeit M2ME accesses the network, and authentication security is further improved.

Figure 6:
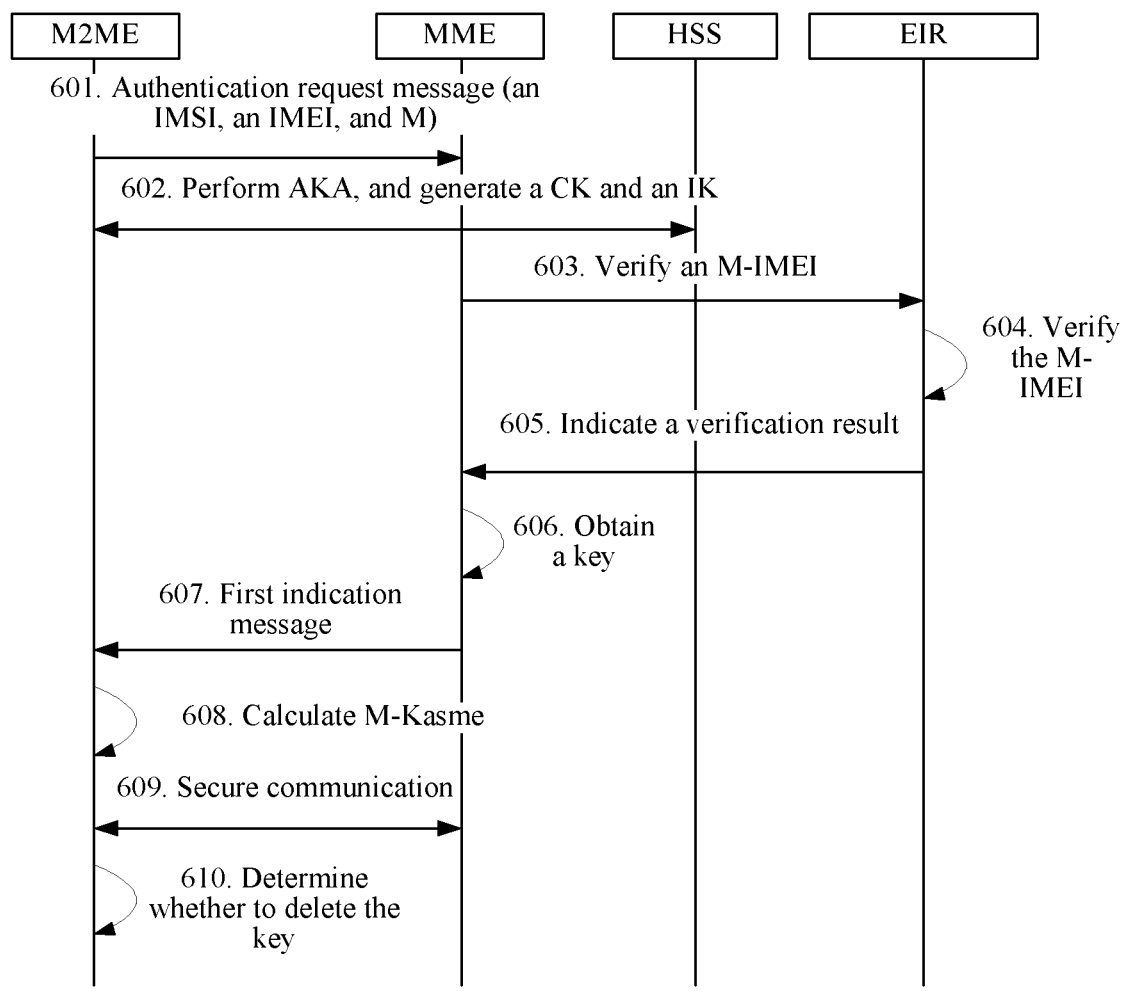
FIG. 6 is a signaling diagram of still another security authentication method according to an embodiment of the present invention.

FIG. 6 is a signaling diagram of still another security authentication method according to an embodiment of the present invention. As shown in FIG. 6, the method includes:

601: M2ME sends an authentication request message to an MME, where the authentication request message may include an IMSI, an IMEI, and M, and M is used to identify that the terminal equipment is M2ME.

602: The M2ME, the MME, and an HSS perform AKA based on the IMSI, to implement inter-authentication of the M2ME and a network side; and generate a CK and an IK.

603: After the AKA succeeds, the MME sends an M-IMEI to an EIR for verification.

604: The EIR verifies whether the M-IMEI is a legal identifier.

605: The EIR indicates a verification result in step 604 to the MME.

606: When receiving a verification result which is sent by the EIR and indicates that the M-IMEI is a legal identifier, the MME generates a second cipher key CK' and a second integrity key IK' according to the CK, the IK and the M-IMEI, and obtains a key M-Kasme according to CK' and IK'.

If the verification succeeds, the MME calculates CK' and IK' based on the M-IMEI, the CK and the IK, where CK, IK'=KDF(CK,IK,M-IMEI,PLMN-ID); and then calculates M-Kasme by using CK' and IK'.

CK and IK' may be calculated in the MME, and may also be calculated by the HSS and then sent to the MME.

607: The MME sends a first indication message to the M2ME.

The MME sends a verification success indication message to the M2ME.

608: After receiving the first indication message, the M2ME generates CK and IK' according to the CK, the IK and the M-IMEI, and then calculates M-Kasme by using CK' and IK'.

609: The M2ME and the MME perform an NAS SMC process according to an EPS mechanism, so that the M2ME and the network side may securely perform communication by using M-Kasme and a negotiated algorithm.

610: After performing secure communication with the MME according to the key, the M2ME determines, according to an indication identifier received from the MME or an indication identifier pre-configured in the M2ME, whether to delete the key.

610 is the same as 315 in the embodiment shown in FIG. 3, and the details are not described herein again.

In the security authentication method according to the embodiment of the present invention, after the terminal equipment, mobility management entity, and home subscriber system successfully perform authentication and key agreement, the home subscriber system verifies whether an equipment identifier is legal, and when the equipment identifier is a legal identifier, the mobility management entity obtains the key according to the equipment identifier, so that the mobility management entity and the terminal equipment perform secure communication according to the key, thereby implementing secure communication between the M2M equipment and network side. Moreover, in this embodiment, it is not required to generate K'. Authentication vector (Authentication vector, AV) binding is performed, CK' and IK' are calculated according to an M-IMEI, and then Kasme is calculated, which provides another manner of generating a key.

The embodiment of the present invention may also be applied in a UMTS network. The application of the embodiment of the present invention in the UMTS network is described in the following with reference to FIG. 7 and FIG. 8.

Figure 7:
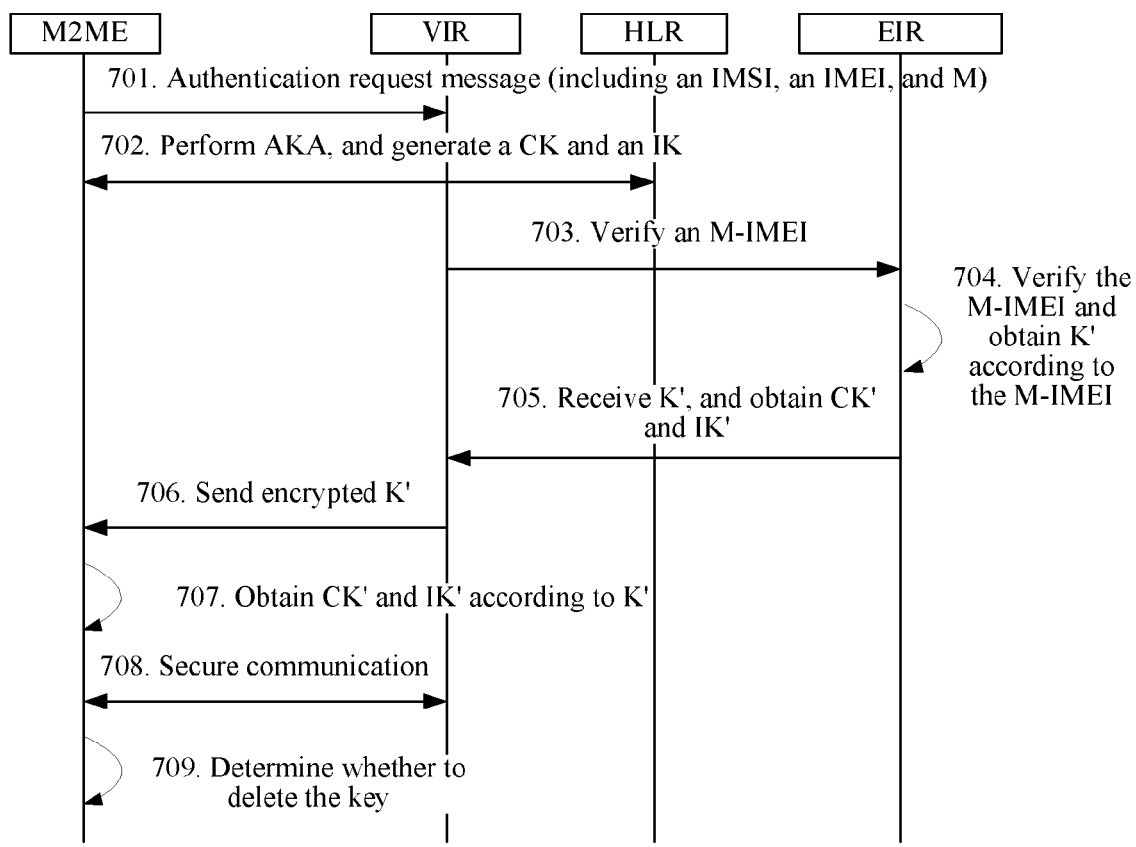
FIG. 7 is a signaling diagram of still another security authentication method according to an embodiment of the present invention.

FIG. 7 is a signaling diagram of still another security authentication method according to an embodiment of the present invention, and this embodiment illustrates application of the solutions in the embodiments shown in FIG. 2 to FIG. 5 in a UMTS network. As shown in FIG. 7, the method includes:

701: M2ME sends an authentication request message to a VLR, where the authentication request message may include an IMSI, an IMEI, and M, and M is used to identify that the terminal equipment is M2ME.

In this embodiment, the VLR is equivalent to an MME in each of the foregoing embodiments, and an HLR is equivalent to an HSS in each of the foregoing embodiments.

702: The M2ME, the VLR, and the HLR perform AKA based on the IMSI, to implement inter-authentication of the M2ME and a network side; and generate a cipher key CK and an integrity key IK.

703: After the AKA succeeds, the VLR sends an M-IMEI to an EIR for verification.

704: The EIR verifies whether the M-IMEI is a legal identifier; and when the M-IMEI is a legal identifier, the EIR obtains, according to the M-IMEI, a first key K' corresponding to the M-IMEI.

705: The VLR receives K' sent by the EIR, obtains a third cipher key CK' through calculation according to the CK and K' and by using an encryption algorithm pre-configured in the VLR, and obtains a third integrity key IK' through calculation according to the IK and K', where CK'=F(CK, K'), and IK'=F (IK, K').

Operator network domain security exists between the VLR and the EIR, and it is considered by default that the first key K' can be securely sent. CK and IK' may be calculated by the VLR, and may also be calculated by the HLR and then sent to the VLR.

706: The VLR encrypts the first key K' according to the CK and the IK, and sends the encrypted first key K' to the M2ME.

707: After receiving the encrypted first key K', the M2ME first performs decryption to obtain the first key K', and then obtains the third cipher key CK' through calculation according to the CK and K' and by using an encryption algorithm pre-configured in the M2ME, and obtains the third integrity key IK' through calculation according to the IK and K', where CK'=F(CK, K'), and IK'=F(IK, K').

708: The M2ME and the network side perform secure communication based on CK' and IK'.

In this embodiment, the M2ME and the network side perform secure communication by using the third cipher key CK' and the third integrity key IK' as keys.

709: After performing secure communication with the VLR according to the key, the M2ME determines, according to an indication identifier received from the VLR or an indication identifier pre-configured in the M2ME, whether to delete the key.

709 is the same as 315 in the embodiment shown in FIG. 3, and the details are not described herein again.

In the security authentication method in the embodiment of the present invention, after the terminal equipment, VLR, and home subscriber system successfully perform authentication and key agreement, the home subscriber system verifies whether an equipment identifier is legal, and when the equipment identifier is a legal identifier, the VLR obtains the key according to the equipment identifier, so that the VLR and the terminal equipment perform secure communication according to the key, thereby implementing secure communication between the M2M equipment and network side.

Figure 8:
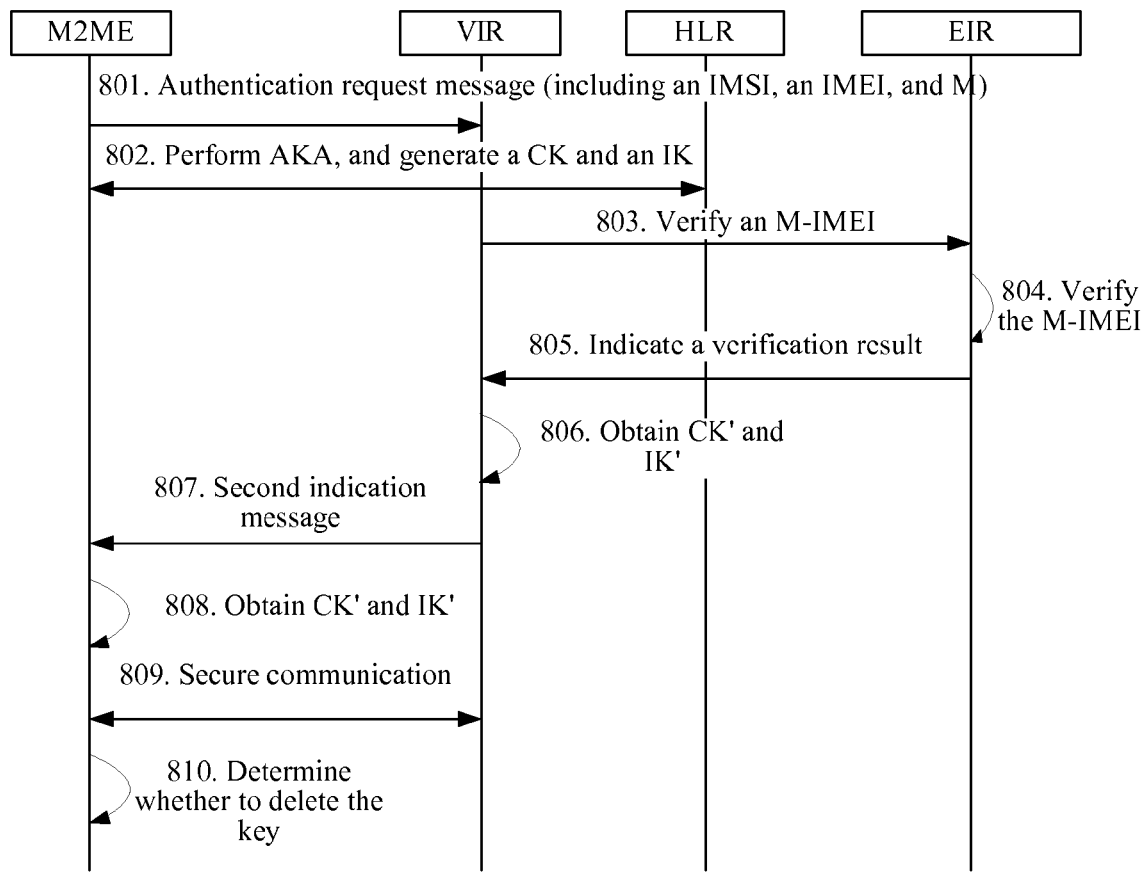
FIG. 8 is a signaling diagram of still another security authentication method according to an embodiment of the present invention.

FIG. 8 is a signaling diagram of still another security authentication method according to an embodiment of the present invention, and this embodiment illustrates application of the solution in the embodiment shown in FIG. 6 in a UMTS network. As shown in FIG. 8, the method includes:

801: M2ME sends an authentication request message to a VLR, where the authentication request message may include an IMSI, an IMEI, and M, and M is used to identify that the terminal equipment is M2ME.

In this embodiment, the VLR is equivalent to an MME in each of the foregoing embodiments, and an HLR is equivalent to an HSS in each of the foregoing embodiments.

802: The M2ME, the VLR, and the HLR perform AKA based on the IMSI, to implement inter-authentication of the M2ME and a network side; and generate a cipher key CK and an integrity key IK.

803: After the AKA succeeds, the VLR sends an M-IMEI to an EIR for verification.

804: The EIR verifies whether the M-IMEI is a legal identifier.

805: The EIR indicates a verification result in step 804 to the VLR.

806: When receiving a verification result which is sent by the EIR and indicates that the M-IMEI is a legal identifier, the VLR generates a fourth cipher key CK' and a fourth integrity key IK' according to the CK, the IK and the M-IMEI.

If the verification succeeds, the VLR calculates the fourth cipher key CK' and the fourth integrity key IK' based on the M-IMEI, the CK and the IK, where CK',IK'=KDF(CK,IK,M-IMEI,PLMN-ID).

CK' and IK' may be calculated in the VLR, and may also be calculated by the EIR and then sent to the VLR.

807: The VLR sends a second indication message to the M2ME.

The VLR sends a verification success indication message to the M2ME.

808: After receiving the second indication message, the M2ME generates the fourth cipher key CK' and the fourth integrity key IK' according to the CK, the IK and the M-IMEI.

809: The M2ME and the network side perform secure communication based on the fourth cipher key CK' and the fourth integrity key IK'.

In this embodiment, the M2ME and the network side perform secure communication by using the fourth cipher key CK' and the fourth integrity key IK' as keys.

810: After performing secure communication with the VLR according to the keys, the M2ME determines, according to an indication identifier received from the VLR or an indication identifier pre-configured in the M2ME, whether to delete the keys.

810 is the same as 315 in the embodiment shown in FIG. 3, and the details are not described herein again.

In the security authentication method according to the embodiment of the present invention, after the terminal equipment, VLR, and home subscriber system successfully perform authentication and key agreement, the home subscriber system verifies whether an equipment identifier is legal, and when the equipment identifier is a legal identifier, the VLR obtains a key according to the equipment identifier, so that the VLR and the terminal equipment perform secure communication according to the key, thereby implementing secure communication between the M2M equipment and network side. Moreover, in this embodiment, it is not required to generate K'. AV binding is performed, and CK' and IK' are calculated according to an M-IMEI, which provides another manner of generating a key.

The foregoing method provided by the embodiments of the present invention may also be applied in a scenario where relay (Relay) equipment accesses a network by using a pluggable card. In order to prevent an attacker from applying a legal card to illegal Relay equipment, or in order to prevent an attacker from applying an illegally duplicated card to legal Relay equipment, it is required to perform security authentication on the Relay equipment. In this scenario, the M2ME in each of the foregoing embodiments may be replaced with the Relay equipment, and the feature identifier for identifying the M2ME is replaced with an identifier IMEI' capable of uniquely identifying the Relay equipment. The network side verifies legality of the IMEI', and a root key (key) finally used when the Relay equipment and the network side perform communication is calculated by using a key corresponding to the IMEI' or directly by using the IMEI', thereby completing the authentication of the network on a Relay card and the Relay equipment. For a specific procedure, reference is made to the description in each of the foregoing embodiments, and the details are not described herein again.

Persons of ordinary skills in the art may understand that all or part of steps in the foregoing method embodiments may be completed by a program instructing relevant hardware. The program may be stored in a computer readable storage medium. When the program is executed, the steps of the method in the embodiment are executed. The storage medium includes various media capable of storing program code, such as a ROM, a RAM, a magnetic disk or an optical disk.

Figure 9:
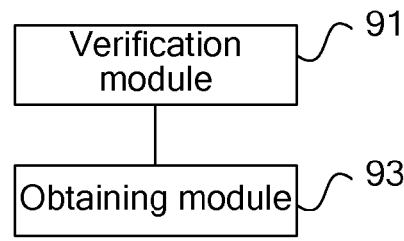
FIG. 9 is a schematic diagram of a mobility management entity according to an embodiment of the present invention.

FIG. 9 is a schematic diagram of a mobility management entity according to an embodiment of the present invention. As shown in FIG. 9, the mobility management entity includes a verification module 91 and an obtaining module 93.

The verification module 91 is configured to verify a feature identifier for identifying terminal equipment, where the terminal equipment is machine-to-machine equipment. The obtaining module 93 is configured to obtain a key corresponding to the feature identifier verified by the verification module 91, so as to perform secure communication with the terminal equipment according to the key.

For the working principles and working procedures of each module in this embodiment, reference is made to the description in the security authentication method provided by each of the foregoing embodiments, and the details are not described herein again.

Through the mobility management entity in the embodiment of the present invention, after the terminal equipment, the mobility management entity, and a home subscriber system successfully perform authentication and key agreement, the mobility management entity verifies whether the feature identifier is legal, and when the feature identifier is a legal identifier, the mobility management entity obtains the key according to the feature identifier, so that the mobility management entity and the terminal equipment perform secure communication according to the key, thereby implementing secure communication between the M2M equipment and a network side.

Figure 10:
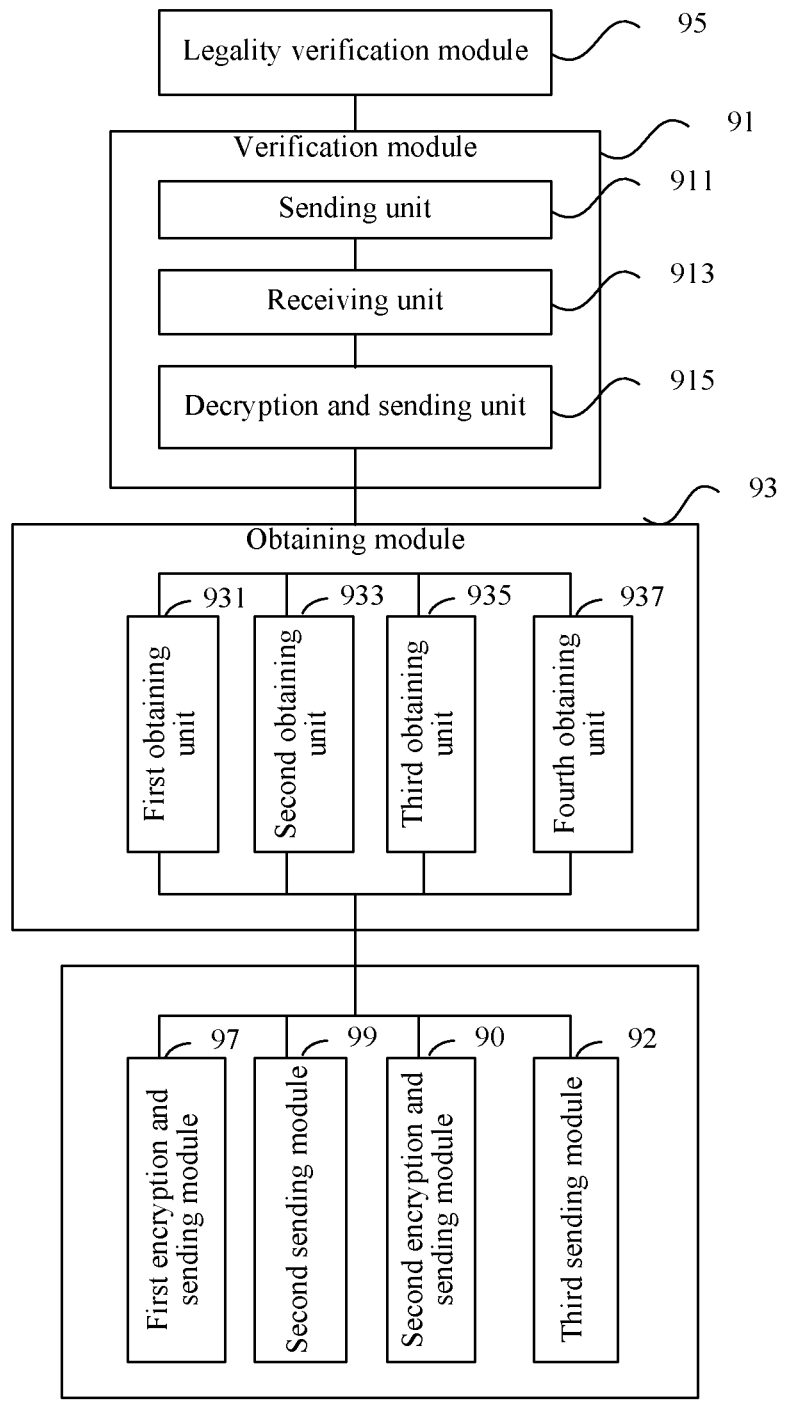
FIG. 10 is a schematic diagram of another mobility management entity according to an embodiment of the present invention.

FIG. 10 is a schematic diagram of another mobility management entity according to an embodiment of the present invention. On the basis of the mobility management entity embodiment shown in FIG. 9, as shown in FIG. 10, the mobility management entity may further include: a legality verification module 95, and a first encryption and sending module 97, a second sending module 99, a second encryption and sending module 90, or a third sending module 92.

Furthermore, the verification module 91 may specifically include a sending unit 911, a receiving unit 913, and a decryption and sending unit 915. The obtaining module 93 may specifically include a first obtaining unit 931, a second obtaining unit 933, a third obtaining unit 935, or a fourth obtaining unit 937.

When the feature identifier is an equipment identifier of the terminal equipment, the verification module 91 is specifically configured to send the equipment identifier to verification equipment for verification, where the equipment identifier is a received equipment identifier sent by the terminal equipment, and the verification equipment is used for verifying the equipment identifier.

When the feature identifier is a certificate of the terminal equipment, the verification module 91 is specifically configured to: if it is verified that a signature of the certificate is correct, calculate an authentication token according to a public key of the certificate, to verify legality of the certificate.

The sending unit 911 is configured to send a request message to the terminal equipment. The receiving unit 913 is configured to: receive an equipment identifier which is sent by the terminal equipment according to the request message sent by the sending unit 911, and is encrypted by the terminal equipment according to a cipher key and/or an integrity key, where the cipher key and the integrity key are generated after authentication and key agreement is successfully performed according to a user identifier. The decryption and sending unit 915 is configured to decrypt the encrypted equipment identifier received by the receiving unit 913, and send the decrypted equipment identifier to the verification equipment for verification.

The first obtaining unit 931 is configured to: obtain a first key corresponding to the feature identifier verified by the verification module 91; and obtain the key according to the first key and according to the cipher key and the integrity key which are generated after the authentication and key agreement succeeds. The second obtaining unit 933 is configured to: generate a second cipher key and a second integrity key according to the cipher key and the integrity key which are generated after the authentication and key agreement succeeds, and according to the feature identifier verified by the verification module 91; and obtain the key according to the second cipher key and the second integrity key. The third obtaining unit 935 is configured to: obtain a first key corresponding to the feature identifier verified by the verification module 91; generate a third cipher key according to the first key and according to the cipher key generated after the authentication and key agreement succeeds; and generate a third integrity key according to the first key and according to the integrity key generated after the authentication and key agreement succeeds; where the key includes the third cipher key and the third integrity key. The fourth obtaining unit 937 is configured to generate a fourth cipher key and a fourth integrity key according to the cipher key and the integrity key which are generated after the authentication and key agreement succeeds, and according to the feature identifier verified by the verification module 91; where the key includes the fourth cipher key and the fourth integrity key.

The legality verification module 95 is configured to: before the verification module 91 verifies the feature identifier, send a received user identifier and the received equipment identifier of the terminal equipment to a home subscriber system for verification, so as to verify legality of correspondence between the user identifier and the equipment identifier.

The first encryption and sending module 97 is configured to: after the first obtaining unit 931 obtains the first key corresponding to the feature identifier, encrypt the first key according to the cipher key and the integrity key; and send the encrypted first key to the terminal equipment, so that the terminal equipment obtains the key according to the first key, the cipher key and the integrity key.

The second sending module 99 is configured to: when the second obtaining unit 933 obtains the key or after the second obtaining unit 933 obtains the key, send a first indication message to the terminal equipment, so that the terminal equipment generates the second cipher key and the second integrity key according to the cipher key, the integrity key and the feature identifier, and obtains the key according to the second cipher key and the second integrity key.

The second encryption and sending module 90 is configured to: after the third obtaining unit 935 obtains the first key corresponding to the equipment identifier, encrypt the first key according to the cipher key and the integrity key; and send the encrypted first key to the terminal equipment, so that the terminal equipment generates the third cipher key according to the first key and the cipher key, and generates the third integrity key according to the first key and the integrity key.

The third sending module 92 is configured to: when the fourth obtaining unit 937 obtains the key or after the fourth obtaining unit 937 obtains the key, send a second indication message to the terminal equipment, so that the terminal equipment generates the fourth cipher key and the fourth integrity key according to the cipher key, the integrity key and the feature identifier.

For the working principles and the working procedures of each module and each unit in this embodiment, reference is made to the description in the security authentication method provided by each of the foregoing embodiments, and the details are not described herein again.

Through the mobility management entity according to the embodiment of the present invention, after the terminal equipment, mobility management entity, and home subscriber system successfully perform authentication and key agreement, the home subscriber system verifies whether the equipment identifier is legal, and when the equipment identifier is a legal identifier, the mobility management entity obtains the key according to the equipment identifier, so that the mobility management entity and the terminal equipment perform secure communication according to the key, thereby implementing secure communication between the M2M equipment and network side. Moreover, in this embodiment, correspondence between the user identifier and the equipment identifier is verified, which can prevent an attacker from illegally accessing the network, and further improve authentication security. In addition, only after the authentication and key agreement succeeds, the mobility management entity may request the equipment identifier of the terminal equipment from the terminal equipment, so that the terminal equipment encrypts the equipment identifier according to the cipher key and/or integrity key generated after the authentication succeeds, and then sends the encrypted equipment identifier to the mobility management entity, thereby avoiding sending the equipment identifier by using a plaintext, and further improving the authentication security. Furthermore, a certificate of the M2ME may be used as the feature identifier, and therefore, by verifying legality of the certificate of the M2ME it is avoided that counterfeit M2ME accesses the network, thereby further improving authentication security. K' may also not be generated. AV binding is performed, CK' and IK' are calculated according to an M-IMEI, and then Kasme is calculated, which provides another manner of generating a key.

Figure 11:
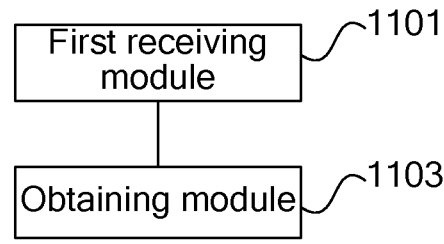
FIG. 11 is a schematic diagram of terminal equipment according to an embodiment of the present invention.

FIG. 11 is a schematic diagram of terminal equipment according to an embodiment of the present invention. As shown in FIG. 11, the terminal equipment includes a first receiving module 1101 and an obtaining module 1103.

The first receiving module 1101 is configured to receive a service message which is sent by a mobility management entity and corresponds to a feature identifier for identifying the terminal equipment. The obtaining module 1103 is configured to obtain a key according to the service message received by the first receiving module 1101, so as to perform secure communication with the mobility management entity according to the key, where the terminal equipment is machine-to-machine equipment.

For the working principle and the working procedure of each module in this embodiment, reference is made to the description in the security authentication method provided by each of the foregoing embodiments, and the details are not described herein again.

Through the terminal equipment in the embodiment of the present invention, when the terminal equipment, the mobility management entity, and a home subscriber system successfully perform authentication and key agreement, and it is verified that the feature identifier is a legal identifier, the terminal equipment obtains the key according to the service message corresponding to the feature identifier, so that the mobility management entity and the terminal equipment perform secure communication according to the key, thereby implementing the secure communication between the M2M equipment and a network side.

Figure 12:
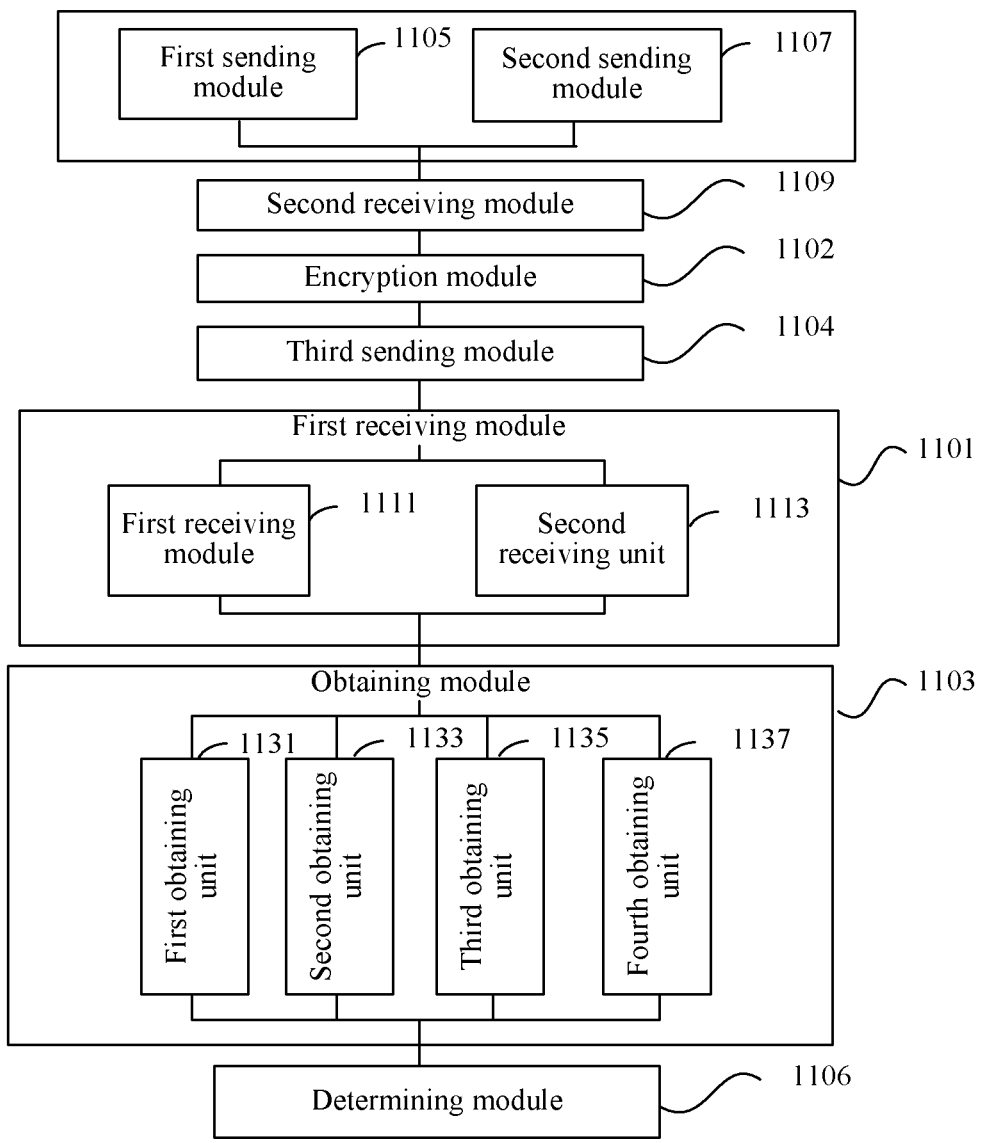
FIG. 12 is a schematic diagram of another kind of terminal equipment according to an embodiment of the present invention.

FIG. 12 is a schematic diagram of another kind of terminal equipment according to an embodiment of the present invention. On the basis of the terminal equipment embodiment shown in FIG. 11, as shown in FIG. 12, the terminal equipment may further include: a first sending module 1105 or a second sending module 1107, a second receiving module 1109, an encryption module 1102, a third sending module 1104, and a determining module 1106.

Furthermore, the first receiving module 1101 may specifically include a first receiving unit 1111 or a second receiving unit 1113; the obtaining module 1103 may specifically include a first obtaining unit 1131, a second obtaining unit 1133, a third obtaining unit 1135, or a fourth obtaining unit 1137.

The first receiving unit 1111 is configured to receive a first key which is sent by a mobility management entity and is encrypted by the mobility management entity according to a cipher key and an integrity key, where the first key corresponds to the feature identifier, and the cipher key and the integrity key are generated after authentication and key agreement succeeds. The second receiving unit 1113 is configured to receive a first indication message sent by the mobility management entity.

The first obtaining unit 1131 is configured to: after the first receiving unit 1111 receives the first key, obtain a key according to the first key, the cipher key and the integrity key. The second obtaining unit 1133 is configured to: after the first receiving unit 1111 receives the first key, generate a third cipher key according to the first key and the cipher key, and generate a third integrity key according to the first key and the integrity key, where a key includes the third cipher key and the third integrity key. The third obtaining unit 1135 is configured to: after the second receiving unit 1113 receives the first indication message, generate a second cipher key and a second integrity key according to the cipher key, the integrity key and the feature identifier, and obtain a key according to the second cipher key and the second integrity key. The fourth obtaining unit 1137 is configured to: after the second receiving unit 1113 receives the first indication message, generate a fourth cipher key and a fourth integrity key according to the cipher key, the integrity key and the feature identifier, where a key includes the fourth cipher key and the fourth integrity key.

The first sending module 1105 is configured to: before the first receiving module 1101 receives the service message, send an authentication request message including a user identifier and the feature identifier to the mobility management entity.

The second sending module 1107 is configured to: after the authentication and key agreement is successfully performed according to the user identifier, and before the first receiving module 1101 receives the service message, send the feature identifier to the mobility management entity.

The second receiving module 1109 is configured to: after the authentication and key agreement is successfully performed according to the user identifier of the terminal equipment, and before the first receiving module 1101 receives the service message, receive a request message sent by the mobility management entity.

The encryption module 1102 is configured to: after the second receiving module 1109 receives the request message, encrypt the feature identifier according to the cipher key and/or the integrity key, where the cipher key and the integrity key are generated after the authentication and key agreement succeeds.

The third sending module 1104 is configured to send the feature identifier encrypted by the encryption module 1102 to the mobility management entity according to the request message received by the second receiving module 1109.

The determining module 1106 is configured to: after the secure communication is performed with the mobility management entity according to the key obtained by the obtaining module 1103, determine, according to an indication identifier received from the mobility management entity or a pre-configured indication identifier, whether to delete the key.

For the working principles and the working procedures of each modules and each unit in this embodiment, reference is made to the description in the security authentication method provided by each of the foregoing embodiments, and the details are not described herein again.

Through the terminal equipment in the embodiment of the present invention, when the terminal equipment, mobility management entity, and home subscriber system successfully perform authentication and key agreement, and it is verified that the feature identifier is a legal identifier, the terminal equipment obtains the key according to the service message corresponding to the feature identifier, so that the mobility management entity and the terminal equipment perform secure communication according to the key, thereby implementing the secure communication between the M2M equipment and network side.

An embodiment of the present invention further provides a security authentication system, including any mobility management entity and any terminal equipment provided by the embodiments of the present invention.

For the working principles and the working procedures of each module and each unit in this embodiment, reference is made to the description in the security authentication method provided by each of the foregoing embodiments, and the details are not described herein again.

In the security authentication system according to the embodiment of the present invention, after the terminal equipment, the mobility management entity, and a home subscriber system successfully perform authentication and key agreement, the mobility management entity verifies whether a feature identifier is legal, and when the feature identifier is a legal identifier, the mobility management entity obtains a key according to the feature identifier, so that the mobility management entity and the terminal equipment perform secure communication according to the key, thereby implementing secure communication between M2M equipment and a network side.

Finally, it should be noted that the foregoing embodiments are merely provided for describing the technical solutions of the present invention, but not intended to limit the present invention. Although the present invention are described in detail with reference to the embodiments, a person skilled in the art should understand that modifications still can be made to the technical solution described in each of the foregoing embodiments, or equivalent replacements still can be made to some technical features in the technical solution; and such modifications or replacements do not cause the essence of corresponding technical solutions to depart from the spirit and scope of the technical solution in each of the embodiments of the present invention.

What is claimed is:

1. A security authentication method, characterized by comprising:
    verifying a feature identifier to identify terminal equipment, wherein the terminal equipment is machine-to-machine equipment; and
    obtaining a key corresponding to the feature identifier, so as to perform secure communication with the terminal equipment according to the key, wherein the feature identifier is an equipment identifier of the terminal equipment, and the verifying of the feature identifier comprises:
sending the equipment identifier to verification equipment for verification, wherein the equipment identifier is a received equipment identifier sent by the terminal equipment, and the verification equipment is used to verify the equipment identifier, and
wherein before the sending the equipment identifier to the verification equipment for verification, wherein the equipment identifier is the received equipment identifier sent by the terminal equipment, and the verification equipment is used to verify the equipment identifier, the method further comprises:
sending a request message to the terminal equipment, and
receiving an equipment identifier which is sent by the terminal equipment according to the request message and is encrypted by the terminal equipment according to a cipher key and/or an integrity key, wherein the cipher key and the integrity key are generated after authentication and key agreement is successfully performed according to a user identifier; and
sending the equipment identifier to the verification equipment for verification, wherein the equipment identifier is the received equipment identifier sent by the terminal equipment, and the verification equipment is used to verify the equipment identifier, comprises:
decrypting the encrypted equipment identifier, and sending the decrypted equipment identifier to the verification equipment for verification.

2. The security authentication method according to claim 1, wherein before the verifying the feature identifier for identifying the terminal equipment, the method further comprises:
sending a received user identifier and the received equipment identifier of the terminal equipment to a home subscriber system for verification, so as to verify legality of correspondence between the user identifier and the equipment identifier.

3. The security authentication method according to claim 1, wherein the obtaining the key corresponding to the feature identifier comprises:
obtaining a first key corresponding to the feature identifier; and obtaining the key according to the first key and according to a cipher key and an integrity key which are generated after authentication and key agreement succeeds.

4. The security authentication method according to claim 3, further comprising:
after the obtaining the first key corresponding to the feature identifier, encrypting the first key according to the cipher key and the integrity key; and sending the encrypted first key to the terminal equipment, so that the terminal equipment obtains the key according to the first key, the cipher key and the integrity key.

5. The security authentication method according to claim 3, comprising:
sending a first indication message to the terminal equipment, so that the terminal equipment generates the second cipher key and the second integrity key according to the cipher key, the integrity key and the feature identifier, and obtains the key according to the second cipher key and the second integrity key.

6. The security authentication method according to claim 1, wherein the obtaining the key corresponding to the feature identifier comprises:
obtaining a first key corresponding to the feature identifier; generating a third cipher key according to the first key and according to a cipher key generated after authentication and key agreement succeeds; and generating a third integrity key according to the first key and according to an integrity key generated after the authentication and key agreement succeeds, wherein the key comprises the third cipher key and the third integrity key.

7. The security authentication method according to claim 6, further comprising:
after the obtaining the first key corresponding to the equipment identifier, encrypting the first key according to the cipher key and the integrity key; and sending the encrypted first key to the terminal equipment, so that the terminal equipment generates the third cipher key according to the first key and the cipher key, and generates the third integrity key according to the first key and the integrity key.

8. The security authentication method according to claim 6, comprising:
sending a second indication message to the terminal equipment, so that the terminal equipment generates the fourth cipher key and the fourth integrity key according to the cipher key, the integrity key and the feature identifier.

9. The security authentication method according to claim 1, wherein the obtaining the key corresponding to the feature identifier comprises:
generating a second cipher key and a second integrity key according to the feature identifier and according to a cipher key and an integrity key which are generated after authentication and key agreement succeeds; and obtaining the key according to the second cipher key and the second integrity key.

10. The security authentication method according to claim 1, wherein the obtaining the key corresponding to the feature identifier comprises:
generating a fourth cipher key and a fourth integrity key according to the feature identifier and according to a cipher key and an integrity key generated after authentication and key agreement succeeds, wherein the key comprises the fourth cipher key and the fourth integrity key.

11. A security authentication method, characterized by comprising:
verifying a feature identifier to identify terminal equipment, wherein the terminal equipment is machine-to-machine equipment; and
obtaining a key corresponding to the feature identifier, so as to perform secure communication with the terminal equipment according to the key, and
wherein the feature identifier is a certificate of the terminal equipment, and the verifying of the feature identifier for identifying the terminal equipment comprises:
if it is verified that a signature of the certificate is correct, calculating an authentication token according to a public key of the certificate, to verify legality of the certificate.

12. A security authentication method, characterized by comprising:
receiving a service message which is sent by a mobility management entity and corresponds to a feature identifier for identifying terminal equipment, wherein the terminal equipment is machine-to-machine equipment; and obtaining a key according to the service message, so as to perform secure communication with the mobility management entity according to the key, and wherein before the receiving the service message which is sent by the mobility management entity and corresponds to the feature identifier for identifying the terminal equipment, and the method further comprises:

after successfully performing the authentication and key agreement according to the user identifier of the terminal equipment, receiving a request message sent by the mobility management entity;

encrypting the feature identifier according to a cipher key and/or an integrity key, wherein the cipher key and the integrity key are generated after authentication and key agreement succeeds; and sending the encrypted feature identifier to the mobility management entity according to the request message.

13. The security authentication method according to claim 12, wherein the receiving the service message which is sent by the mobility management entity and corresponds to the feature identifier for identifying the terminal equipment comprises:

receiving a first key which is sent by the mobility management entity and is encrypted by the mobility management entity according to a cipher key and an integrity key, wherein the first key corresponds to the feature identifier.

14. The security authentication method according to claim 13, wherein the obtaining the key according to the service message comprises:

after receiving the first key, obtaining the key according to the first key, the cipher key and the integrity key.

15. The security authentication method according to claim 13, wherein the obtaining the key according to the service message comprises:

after receiving the first key, generating a third cipher key according to the first key and the cipher key, and generating a third integrity key according to the first key and the integrity key, wherein the key comprises the third cipher key and the third integrity key.

16. The security authentication method according to claim 13, wherein the obtaining the key according to the service message comprises:

after receiving the first indication message, generating a second cipher key and a second integrity key according to the cipher key, the integrity key and the feature identifier, and obtaining the key according to the second cipher key and the second integrity key.

17. The security authentication method according to claim 13, wherein the obtaining the key according to the service message comprises:

after receiving the first indication message, generating a fourth cipher key and a fourth integrity key according to the cipher key, the integrity key and the feature identifier, wherein the key comprises the fourth cipher key and the fourth integrity key.

18. The security authentication method according to claim 12, wherein before the receiving the service message which is sent by the mobility management entity and corresponds to the feature identifier for identifying the terminal equipment, the method further comprises:

sending an authentication request message comprising a user identifier and the feature identifier to the mobility management entity.

19. The security authentication method according to claim 12, wherein the receiving the service message which is sent by the mobility management entity and corresponds to the feature identifier for identifying the terminal equipment comprises:

receiving a first indication message sent by the mobility management entity, and wherein the cipher key and the integrity key are generated after authentication and key agreement succeeds.

20. The security authentication method according to claim 12, wherein before the receiving the service message which is sent by the mobility management entity and corresponds to the feature identifier for identifying the terminal equipment, the method further comprises:

after successfully performing authentication and key agreement according to the user identifier, sending the feature identifier to the mobility management entity.

21. A security authentication method, characterized by comprising:

receiving a service message which is sent by a mobility management entity and corresponds to a feature identifier for identifying terminal equipment, wherein the terminal equipment is machine-to-machine equipment; and obtaining a key according to the service message, so as to perform secure communication with the mobility management entity according to the key, and after performing the secure communication with the mobility management entity according to the key, determining, according to an indication identifier received from the mobility management entity or a pre-configured indication identifier, whether to delete the key.

22. A mobility management entity, characterized by comprising:

the mobility management entity being computer implemented and including:

a verification module, configured to verify a feature identifier for identifying terminal equipment, wherein the terminal equipment is machine-to-machine equipment; and an obtaining module, configured to obtain a key corresponding to the feature identifier verified by the verification module, so as to perform secure communication with the terminal equipment according to the key, and wherein the feature identifier is a certificate of the terminal equipment, and the verification module is specifically configured to: if it is verified that a signature of the certificate is correct, calculate an authentication token according to a public key of the certificate, to verify legality of the certificate.

23. The mobility management entity according to claim 20, wherein the feature identifier is an equipment identifier of the terminal equipment, and the verification module is specifically configured to send the equipment identifier to verification equipment for verification, wherein the equipment identifier is a received equipment identifier sent by the terminal equipment, and the verification equipment is used for verifying the equipment identifier.

24. The mobility management entity according to claim 23, wherein the verification module comprises:

a sending unit, configured to send a request message to the terminal equipment;

a receiving unit, configured to: receive an equipment identifier which is sent by the terminal equipment according to the request message sent by the sending unit, and is encrypted by the terminal equipment according to a cipher key and/or an integrity key, wherein the cipher key and the integrity key are generated after authentication and key agreement is successfully performed according to a user identifier; and a decryption and sending unit, configured to decrypt the encrypted equipment identifier received by the receiving unit, and send the decrypted equipment identifier to the verification equipment for verification.

25. The mobility management entity according to claim 23, further comprising:

a legality verification module, configured to: before the verification module verifies the feature identifier, send a received user identifier and the received equipment identifier of the terminal equipment to a home subscriber system for verification, so as to verify legality of correspondence between the user identifier and the equipment identifier.

26. The mobility management entity according to claim 22, wherein the obtaining module comprises:

a first obtaining unit, configured to: obtain a first key corresponding to the feature identifier verified by the verification module; and obtain the key according to the first key and according to a cipher key and a integrity key which are generated after authentication and key agreement succeeds.

27. The mobility management entity according to claim 26, further comprising:

a first encryption and sending module, configured to: after the first obtaining unit obtains the first key corresponding to the feature identifier, encrypt the first key according to the cipher key and the integrity key; and send the encrypted first key to the terminal equipment, so that the terminal equipment obtains the key according to the first key, the cipher key and the integrity key.

28. The mobility management entity according to claim 26, comprising:

a second sending module, configured to: when one of the second obtaining unit obtains the key or after the second obtaining unit obtains the key, send a first indication message to the terminal equipment, so that the terminal equipment generates the second cipher key and the second integrity key according to the cipher key, the integrity key and the feature identifier, and obtains the key according to the second cipher key and the second integrity key.

29. The mobility management entity according to claim 26, comprising:

a second encryption and sending module, configured to: after the third obtaining unit obtains the first key corresponding to the equipment identifier, encrypt the first key according to the cipher key and the integrity key; and send the encrypted first key to the terminal equipment, so that the terminal equipment generates the third cipher key according to the first key and the cipher key, and generates the third integrity key according to the first key and the integrity key.

30. The mobility management entity according to claim 26, comprising:

a third sending module, configured to: when one of the fourth obtaining unit obtains the key or after the fourth obtaining unit obtains the key, send a second indication message to the terminal equipment, so that the terminal equipment generates the fourth cipher key and the fourth integrity key according to the cipher key, the integrity key and the feature identifier.

31. The mobility management entity according to claim 22, wherein the obtaining module comprises:

a second obtaining unit, configured to: generate a second cipher key and a second integrity key according to a cipher key and an integrity key which are generated after authentication and key agreement succeeds, and according to the feature identifier verified by the verification module; and obtain the key according to the second cipher key and the second integrity key.

32. The mobility management entity according to claim 22, wherein the obtaining module comprises:

a third obtaining unit, configured to: obtain a first key corresponding to the feature identifier verified by the verification module; generate a third cipher key according to the first key and according to a cipher key generated after authentication and key agreement succeeds; and generate a third integrity key according to the first key and according to an integrity key generated after authentication and key agreement succeeds, wherein the key comprises the third cipher key and the third integrity key.

33. The mobility management entity according to claim 22, wherein the obtaining module comprises:

a fourth obtaining unit, configured to generate a fourth cipher key and a fourth integrity key according to a cipher key and an integrity key generated after authentication and key agreement succeeds, and according to the feature identifier verified by the verification module, wherein the key comprises the fourth cipher key and the fourth integrity key.

34. Terminal equipment, characterized by comprising:

a first receiving module, configured to receive a service message which is sent by a mobility management entity and corresponds to a feature identifier of a terminal equipment; and an obtaining module, configured to: obtain a key according to the service message received by the first receiving module, so as to perform secure communication with the mobility management entity according to the key, wherein the terminal equipment is machine-to-machine equipment, a second receiving module, configured to: after authentication and key agreement is successfully performed according to a user identifier of the terminal equipment, and before the first receiving module receives the service message, receive a request message sent by the mobility management entity;

an encryption module, configured to: after the second receiving module receives the request message, encrypt the feature identifier according to a cipher key and/or an integrity key, wherein the cipher key and the integrity key are generated after the authentication and key agreement succeeds; and a third sending module, configured to send the feature identifier encrypted by the encryption module to the mobility management entity according to the request message received by the second receiving module.

35. The terminal equipment according to claim 34, wherein the first receiving module comprises:

a first receiving unit, configured to receive a first key which is sent by the mobility management entity and is encrypted by the mobility management entity according to a cipher key and an integrity key, wherein the first key corresponds to the feature identifier.

36. The terminal equipment according to claim 35, wherein the obtaining module comprises:

a first obtaining unit, configured to: after the first receiving unit receives the first key, obtain the key according to the first key, the cipher key and the integrity key.

37. The terminal equipment according to claim 35, wherein the obtaining module comprises:

a second obtaining unit, configured to: after the first receiving unit receives the first key, generate a third cipher key according to the first key and the cipher key, and generate a third integrity key according to the first key and the integrity key, wherein the key comprises the third cipher key and the third integrity key.

38. The terminal equipment according to claim 35, wherein the obtaining module comprises:
a third obtaining unit, configured to: after the second receiving unit receives the first indication message, generate a second cipher key and a second integrity key according to the cipher key, the integrity key and the feature identifier, and obtain the key according to the second cipher key and the second integrity key.

39. The terminal equipment according to claim 35, wherein the obtaining module comprises:
a fourth obtaining unit, configured to: after the second receiving unit receives the first indication message, generate a fourth cipher key and a fourth integrity key according to the cipher key, the integrity key and the feature identifier, wherein the key comprises the fourth cipher key and the fourth integrity key.

40. The terminal equipment according to claim 34, further comprising:
a first sending module, configured to: before the first receiving module receives the service message, send an authentication request message comprising a user identifier and the feature identifier to the mobility management entity.

41. The terminal equipment according to claim 34, wherein the first receiving module comprises:
a second receiving unit, configured to receive a first indication message sent by the mobility management entity, wherein the cipher key and the integrity key are generated after authentication and key agreement succeeds.

42. The terminal equipment according to claim 34, comprising:
a second sending module, configured to: after authentication and key agreement is successfully performed according to the user identifier, and before the first receiving module receives the service message, send the feature identifier to the mobility management entity.

43. Terminal equipment, characterized by comprising:
a first receiving module, configured to receive a service message which is sent by a mobility management entity and corresponds to a feature identifier of a terminal equipment; and
an obtaining module, configured to: obtain a key according to the service message received by the first receiving module, so as to perform secure communication with the mobility management entity according to the key, wherein the terminal equipment is machine-to-machine equipment, and
a determining module, configured to, after the secure communication is performed with the mobility management entity according to the key obtained by the obtaining module, determine, according to an indication identifier received from the mobility management entity or a preconfigured indication identifier, whether to delete the key.

* * * * *

UNITED STATES PATENT AND TRADEMARK OFFICE
CERTIFICATE OF CORRECTION

PATENT NO. : 8,713,320 B2  
APPLICATION NO. : 13/606838  
DATED : April 29, 2014  
INVENTOR(S) : Xu et al.

Page 1 of 1

It is certified that error appears in the above-identified patent and that said Letters Patent is hereby corrected as shown below:

In the Claims

Column 22, Line 50, Claim 23, delete "claim 20," and insert -- claim 22, --, therefor.

Signed and Sealed this
Sixteenth Day of September, 2014

Michelle K. Lee
*Deputy Director of the United States Patent and Trademark Office*